(12) United States Patent
Heim et al.

(10) Patent No.: US 9,132,371 B2
(45) Date of Patent: Sep. 15, 2015

(54) FILTER ELEMENT FOR AN AIR INLET SYSTEM

(71) Applicant: MANN+HUMMEL GMBH, Ludwigsburg (DE)

(72) Inventors: Michael Heim, Freiberg (DE); Pascal Neef, Renningen (DE); Arthur Sudermann, Muenchingen (DE); Werner Blossey, Benningen (DE); Torsten Fritzsching, Vaihingen (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 31 days.

(21) Appl. No.: 13/871,605

(22) Filed: Apr. 26, 2013

(65) Prior Publication Data
US 2013/0232928 A1    Sep. 12, 2013

Related U.S. Application Data (63) Continuation of application No. PCT/EP2011/068147, filed on Oct. 18, 2011.

(30) Foreign Application Priority Data

Oct. 26, 2010    (DE) .................. 10 2010 049 411

(51) Int. Cl.
*B01D 50/00*    (2006.01)
*B01D 46/24*    (2006.01)
*B01D 46/00*    (2006.01)
*F02M 35/024*    (2006.01)
*F02M 35/04*    (2006.01)

(52) U.S. Cl.
CPC .......... *B01D 46/0043* (2013.01); *B01D 50/002* (2013.01); *F02M 35/02491* (2013.01); *F02M 35/044* (2013.01)

(58) Field of Classification Search
CPC .... B01D 46/0043; B01D 46/24; B01D 50/00; B01D 50/002
USPC ........... 55/315, 317, 343, 431, 432, 328, 333, 55/385.3, 468, 473, 496, 503, 507, 521, 55/320, 330, 331, 332, 337, 418; 123/198 E
See application file for complete search history.

(56) References Cited

U.S. PATENT DOCUMENTS

| | | | | |
|---|---|---|---|---|
| 3,308,610 A * | 3/1967 | Springer et al. | ................ | 55/471 |
| 3,319,404 A * | 5/1967 | Lowther | ......................... | 55/432 |
| 3,616,617 A * | 11/1971 | Groote | ........................... | 55/307 |
| 3,831,355 A | 8/1974 | Mugford | | |
| 4,265,647 A * | 5/1981 | Donachiue | ..................... | 55/315 |
| 4,443,234 A * | 4/1984 | Carlsson | ........................... | 96/57 |
| 4,482,365 A * | 11/1984 | Roach | ............................. | 96/408 |
| 7,670,396 B2 * | 3/2010 | Hussain | ......................... | 55/320 |

* cited by examiner

*Primary Examiner* — Duane Smith
*Assistant Examiner* — Minh-Chau Pham
(74) *Attorney, Agent, or Firm* — James Hasselbeck (57) ABSTRACT

A filter element for an air inlet system includes a filter medium supported on a central tube. An inflow protection element is for flow deflection is arranged in an inflow area of the filter medium. The inflow protection element as well as the central tube and an axial end of the filter medium are embedded into a terminal disk.

15 Claims, 5 Drawing Sheets

FILTER ELEMENT FOR AN AIR INLET SYSTEM

CROSS REFERENCE TO RELATED APPLICATIONS

This application is Bypass Continuation of international patent application no. PCT/EP2011/068147, filed Oct. 18, 2011 designating the United States of America, the entire disclosure of which is incorporated herein by reference. Priority is claimed based on German patent application no. 10 2010 049 411.9 filed Oct. 26, 2010.

TECHNICAL FIELD

The invention concerns a filter element for an air inlet system that comprises a filter medium, in particular in the form of a bellows, for purifying raw air as well as a central tube for supporting the filter medium. Filter elements are used for purifying gaseous substances or substance mixtures, for example, air, and are used, for example, in the automotive industry in air inlet systems of internal combustion engines. The filter medium that can be, for example, a paper filter in the form of a bellows retains contaminants that are contained in the air to be purified. Typically, the contaminants are dust particles of different sizes and chemical composition.

PRIOR ART

Such a filter element is, for example, disclosed in EP 1 591 653 A1. The central tube that is embodied as an oval rib structure forms a support or receptacle for a filter medium, i.e., the filter medium is connected to the jacket surface of the rib structure. In this context, the filter element is arranged in an air filter housing that comprises of raw air inlet and an outlet pipe.

In EP 1 591 653 the air to be purified first enters through the raw air inlet into the air filter housing, impinges then on the exterior surface of the filter medium at the raw air side and penetrates the filter medium as well as the rib structure. In the interior of the rib structure a cavity is formed that, with one end, is sealed by means of a terminal disk relative to the raw air side part of the air filter housing and with the other end opens into the outlet pipe of the air filter housing. The air that has been purified by the filter medium is discharged through the outlet pipe from the cavity of the central tube and thus from the air filter housing.

In principle, in such filter elements or inlet filter systems there is the problem that in the inflow area of the filter element easily an inhomogeneous speed distribution of the incoming gas (for example, air) can be produced. This is caused by various influencing factors.

For example, the precise geometry of the housing in the area of the inflow at the raw air side has a direct influence on the speed distribution in the immediate inflow area of the filter medium. In case of an unfavorable shaping of the housing geometry, a partial breakaway of the raw air side flow from the housing walls can occur and thus cause undesirable turbulences that, inter alia, lead to local speed peaks.

The inhomogeneous inflow of the gas to be purified or the high flow velocity in the inflow area can possibly result in damage of the filter medium. In an extreme case, this can cause rupture of the filter medium (for example, of individual paper folds of a bellows) so that unpurified gas at this location can reach the internal combustion engine and trigger therein contaminations and possibly damages.

It is therefore the object of the invention to improve with simple means the inflow conditions in the area of the filter element and to prevent in particular damage of the filter medium by inflowing gas.

SUMMARY OF THE INVENTION

This object is solved by a filter element of the aforementioned kind that is characterized in that it has an inflow protection element for flow deflection in an inflow area of the filter medium as well as a terminal disk in which the inflow protection element and preferably also the central tube and the filter medium are embedded with one end.

The inflow protection element effects a flow deflection in the inflow area of the filter medium and at the same time can effect a more uniform flow speed distribution of the inflowing gas. This has the result that local speed peaks are avoided and therefore damage of the filter medium is also prevented on the one hand (protective function of the inflow protection element) and on the other hand, because of homogenization of the speed distribution, the performance of the filter medium is improved (performance improvement function of the inflow protection element). The inflow protection element extends at least across the inflow area of the filter element according to the invention, i.e., into the area in which the inflowing gas on its path through the air inlet system is impinging first at high speed on the filter element or the filter medium.

For attachment of the inflow protection element to the filter element according to the invention, the inflow protection element is embodied in the terminal disk, i.e., an end part of the inflow protection element is surrounded by the material of the terminal disk, in particular is embedded by injection molding or by foaming. By embedding or injection molding of the inflow protection element, optionally together with the central tube and the filter medium into the terminal disk, these elements are fixedly connected to each other so that the inflow protection element forms a fixed component of the filter element according to the invention. The terminal disk which is typically produced of a material that can be injection-molded or foamed, for example, a plastic material or a foam material, enables a seal-tight arrangement of the filter element according to the invention in the housing of the air inlet system, i.e., the terminal disk upon installation of the filter element in the air inlet system can be acting as a seal between the raw air side and the clean air side of the air inlet system. Moreover, by embedding or injection molding around the inflow protection element, the central tube, and the filter medium, a tolerance compensation during precise positioning of the inflow protection element is possible, i.e., the relative position of all aforementioned elements can be varied slightly before embedding into the terminal disk so that an adaptation to an individual installation situation of the filter element is possible.

The central tube, which is acting as a support or (jacket-side) receptacle for the filter medium, as well as the filter medium itself can be embedded also with their ends in the terminal disk. The central tube is air-permeable at its jacket surfaces in order to allow air that has passed through the filter medium and therefore has been purified to flow into the interior of the central tube. This is possible, for example, by a perforated jacket surface of the central tube or in that the central tube is embodied as a rib structure. The inflow protection element is in general manufactured of plastic material. The configuration of the filter element according to the invention is particularly simple and has only a small number of elements.

In a preferred embodiment of the filter element, the inflow protection element is connected with one end by means of a plug connection to the central tube. Plug connections are connections that can be produced easily and enable a sufficiently stable storage of the inflow protection element on the central tube. As a simple plug connection, for example, snap hooks or clip connections can be used. When producing the filter element, the inflow protection element can be first secured by the plug connection (snap hooks or clips) on the central tube but can remain slidable still within a tolerance area relative to the central tube. Only upon embedding (for example, by injection molding) of the elements that are connected in this way (inflow protection element and central tube or filter medium) into the terminal disk, these elements are then finally fixed in their relative position to each other. Alternatively, the inflow protection element can also be attached by another connection type, in particular, a fused connection of the central tube.

In another preferred embodiment of the filter element, the inflow protection element is connected with the other end to a further terminal disk of the filter element. In this way, a particularly stable mechanical support of the inflow protection element to the filter element is effected. In particular, with such a configuration of the filter element, the risk is counteracted that the inflow protection element is caused to vibrate by the incoming air. This possibly would cause an acoustic impairment during operation of the filter element.

In a further configuration of the preceding embodiment the inflow protection element is attached by means of a plug connection to the further terminal disk. A plug connection is generally simple and easy to produce, wherein the plug connection in particular can be produced without the aid of tools.

In a further embodiment, the plug connection comprises a counter holder that is embedded with one end in the further terminal disk. The counter holder can project with the other end from the further terminal disk and in the projecting partial area of the counter holder, for example, openings for receiving pins that are formed on the inflow protection element can be provided in order to realize the plug connection.

In another further configuration of the preceding embodiment, the inflow protection element is embedded with the other end directly in the further terminal disk, i.e., a part of the inflow protection element is, for example, surrounded by the material of the terminal disk (by injection molding and/or foaming). By embedding, the respective elements are fixedly connected to each other and this imparts to the filter element a high stability.

In one embodiment, the inflow protection element at the side that is facing away from the filter element has one or several guide ribs, in particular for guiding the flow in the inflow area. The guide ribs are positioned in particular in planes that are substantially parallel to the terminal disks of the filter element but, depending on the inflow conditions, can be arranged in the direction of the filter element in a fan shape in order to enable a more uniform inflow into the filter element. The opening of the fan shape can be either facing the filter element or facing away from it.

It is understood that the inflow protection element optionally can be connected fixedly with the other end on the housing instead of to the filter element. In this case, the inflow protection element has a free end for attachment to the housing on which, for example, locking elements or the like for fixation can be provided.

Preferred is also a filter element that is characterized in that the terminal disk or the terminal disks are made of PUR. PUR (polyurethane) has been proven successful as a material for sealing filter elements or the like in practice.

Preferred is also a filter element in which the inflow protection element, at least in the inflow area, is embodied to be air-impermeable. With the air impermeability of the inflow protection element a passage of raw air through the inflow protection element and thus damage of the filter medium arranged downstream in the flow direction is prevented. Moreover, the flow upon impinging on an air-impermeable obstacle is forced to detour about the obstacle so that a more uniform speed distribution in the inflow area of the filter element can be achieved. It is understood that the inflow protection element optionally can be provided outside of the inflow area with perforations in order to effect beneficially the flow speed distribution.

Preferred is a filter element in which the inflow protection element is extending across the entire length of the filter medium. In this way, the protective function and the performance improvement function of the inflow protection element are achieved across the entire length of the filter medium. The entire length of the filter medium is the length that participates actively in the filtering process (and corresponds, for example, to the entire height of a cylindrical filter medium). When the inflow protection element extends across the entire length of the filter element, it can be attached with the other end, positioned opposite the embedded end, to the terminal disk of the filter element or optionally to the housing of the air inlet system and, in this way, can be additionally stabilized.

Preferred is moreover a filter element in which the inflow protection element has a geometry that is matched to the shape of the filter medium. The inflow protection element has in this connection typically a curvature that is substantially corresponding to the curvature of the filter medium positioned below. In this way, a particularly effective flow deflection in the inflow area of the air inlet system can be achieved. Local speed peaks can be avoided in this way particularly effectively.

Finally, a filter element is preferred in which the inflow protection element at least in a partial area is spaced from the filter medium. Typically, the inflow protection element is spaced from the filter medium with the exception of the areas in which it is connected to the filter element or housing because, as a result of the spacing of the inflow protection element from the filter medium, raw air can flow also into the area immediately between the inflow protection element and the filter medium so that this area can participate actively in purification of the raw air. This enhances the performance improvement function of the inflow protection element. For spacings between the filter medium and the inflow protection element that are typically in the mm range (for example, 5 mm), the performance improvement function is particularly high and the protective function of the inflow protection element is not impaired by spacings that are too large.

In an alternative embodiment, the filter element comprises a terminal disk that is in particular manufactured by injection molding in particular of plastic material wherein the inflow protection element is fused to the terminal disk or is connected to it by a plug connection.

The scope of the invention also encompasses an air inlet system comprising: a housing with a raw air inlet and a clean air outlet, wherein in the housing between the raw air inlet and the clean air outlet a filter element is arranged that is embodied as described above. Such an air inlet system can be advantageously operated particularly effectively because the filter element is protected by the inflow protection element and the filter element cannot be damaged in the inflow area in which the highest speeds occur. Moreover, the inflow protection element provides an increase of the performance of the air inlet system by a homogenous inflow at the filter element in the housing of the air inlet system. Acoustic impairments by a vibrating inflow protection element can also be prevented or greatly reduced.

A preferred air inlet system is characterized in that the inflow protection element with the other end is supported or secured at the housing of the air inlet system. With the additional fixation of the inflow protection element at the housing, the air inlet system achieves a higher mechanical stability in comparison to the one-end connection of the inflow protection element that also contributes to avoiding acoustic effects. It is understood that the inflow protection element can be fixed with the other end on the housing and/or on the filter element.

Finally, a further embodiment of the air inlet system is preferred in which the inflow protection element is at least partially extending across an inflow area of the filter element in the housing area in which the filter element is arranged. In this way, a particularly effective operation of the air inlet system is possible.

Further features and advantages of the invention result from the following description of embodiments of the invention, from the figures of the drawing, that show important inventive details, and from the claims. The individual features can be realized individually separately or several combined to any combination in a variant of the invention.

BRIEF DESCRIPTION OF THE DRAWINGS

Embodiments are illustrated in the schematic drawings and will be explained in the following description. It is shown in.

DETAILED DESCRIPTION

Figure 1:
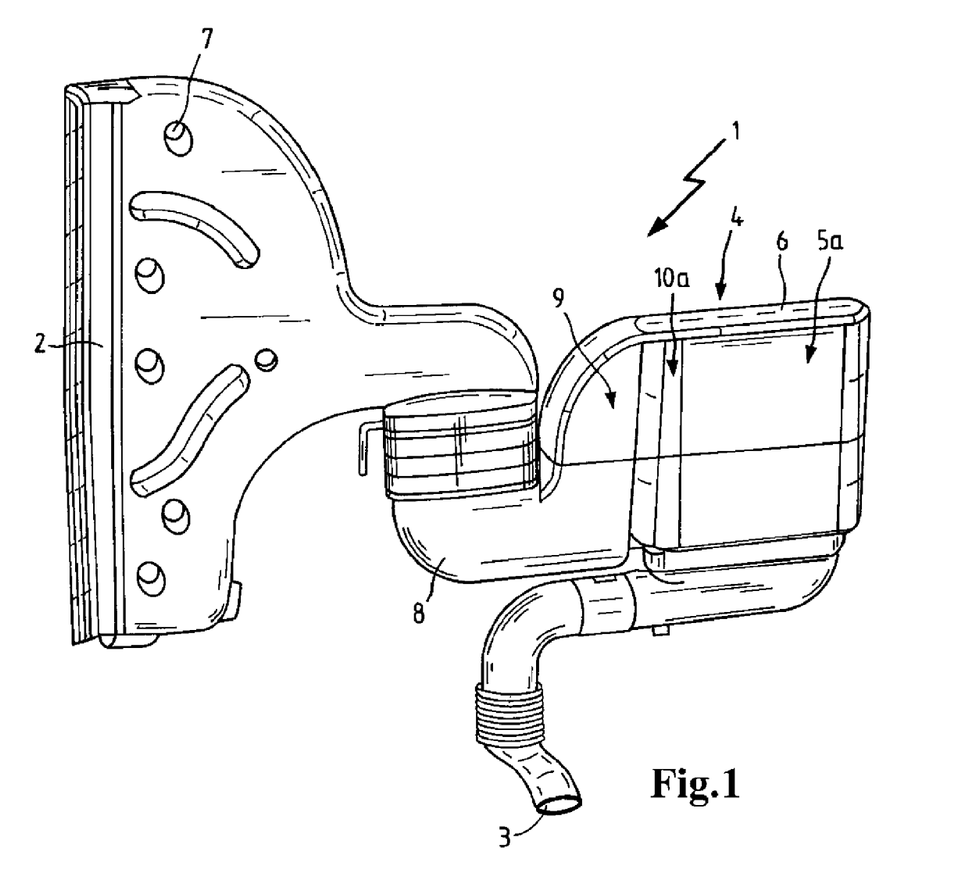
FIG. 1 an air inlet system with a filter element according to the invention in a perspective view.

In FIG. 1, an air inlet system 1 is illustrated that has a raw air inlet 2 and a clean air outlet 3 wherein between the raw air inlet 2 and the clean air outlet 3 a filter element 5 is arranged or inserted in a housing area 4.

The air to be purified (raw air) flows on its path through the air inlet system 1 first through the raw air inlet 2 that can be attached via penetrations 7, for example, on the car body of a motor vehicle. Then the air flows through an adapter 8 into an inflow area 9 of the filter element 5a, is applied to the filter element 5a, and passes after filtration via the clean air outlet 3 out of the air inlet system 1 and then reaches, for example, an internal combustion engine, not illustrated.

Immediately before supplying the raw air to the filter element 5a, the raw air impinges in the flow area 5 on an inflow protection element 10a that deflects the inflowing raw air and distributes it uniformly in the housing area 4 in which the filter element 5a is arranged so that the speed distribution of the raw air is homogenized and local speed peaks are reduced. Accordingly, a damage of the filter element 5a can be avoided and a more effective operation of the filter element 5a is ensured.

Figure 2:
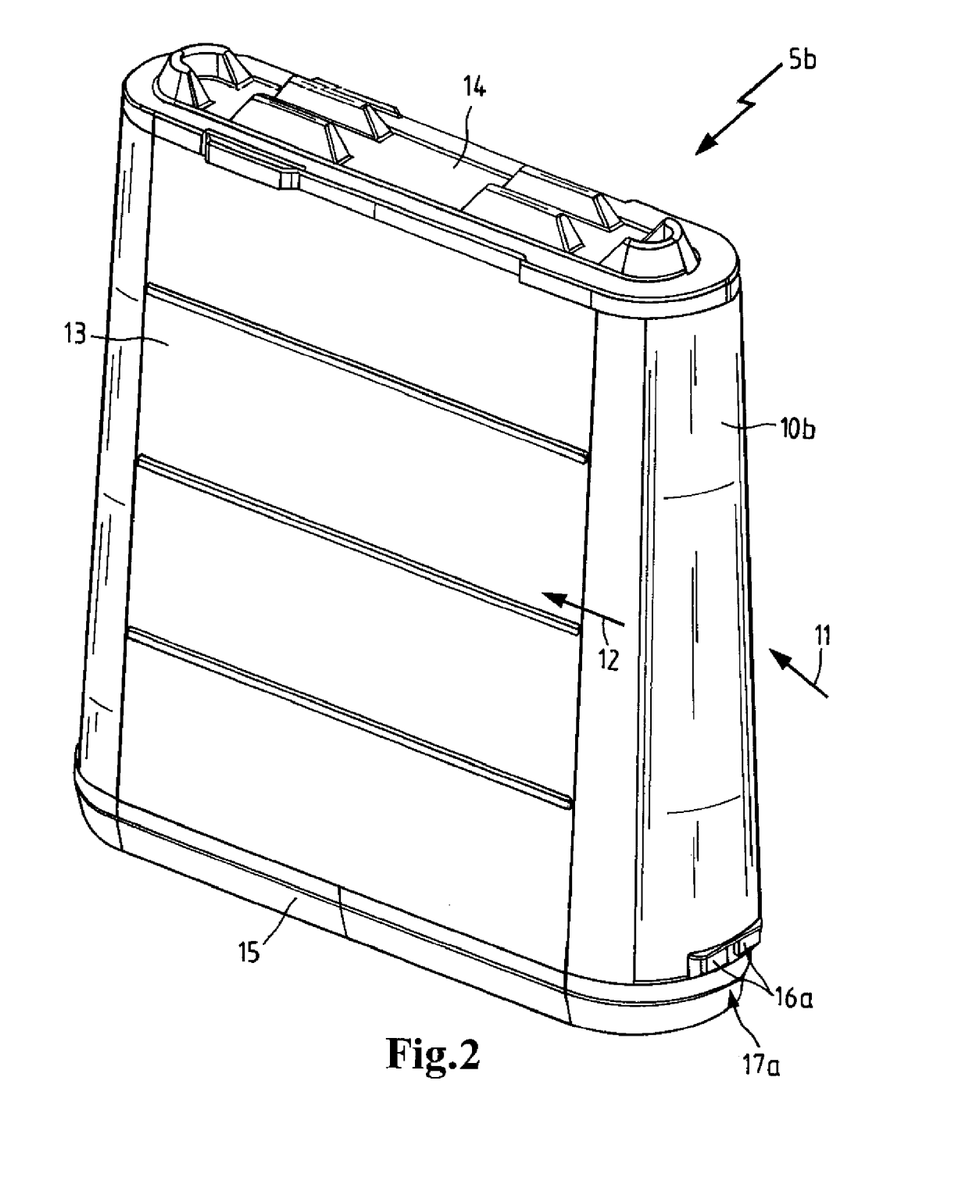
FIG. 2 a filter element according to the invention with an inflow protection element in a perspective view.

In FIG. 2, a filter element 5b is illustrated with an inflow protection element 10b that can be inserted, for example, into the air inlet system of FIG. 1. In the installed state, the filter element 5b is substantially supplied with a flow of raw air coming from a direction according to arrow 11 so that the raw air first impinges on the inflow protection element 10b and is then deflected toward the two oppositely positioned sides of the filter element 5b (compare arrow 12).

The filter element 5b has an annular filter medium 13 in the form of a bellows that is guided about a cylindrical central tube, not illustrated in FIG. 2, wherein the central tube serves as a (jacket-side) receptacle and as a support for the filter medium 13.

The filter element 5b has moreover at its top side (in the drawing) a first terminal disk 14 of PUR in which the inflow protection element 10b, the central tube and the filter medium 13 are embedded with their one end. On the bottom side (in the drawing) of the filter element 5b a further second terminal disk 15 of PUR is formed into which the central tube and the filter medium 13 are embedded with their other end. The inflow protection element 10b is however at the bottom end of the filter element 5b not embedded in the further terminal disk 15 but has two pins 16a of a further plug connection 17a. Upon installation of the filter element 5b in an air inflow system according to FIG. 1, the pins 16a are inserted into a counter receptacle (not illustrated) of the housing 6 of the air inlet system 1 so that the inflow protection element is secured at both ends.

The first terminal disk 14 is embodied to be air impermeable and closes off the top end of the filter element 5b in the housing 6 (compare FIG. 1) seal tightly. The lower second terminal disk 15 closes the interior of the filter element 5 also seal-tightly relative to the raw side but has an outlet opening, not visible in FIG. 2, into which the clean air outlet 3 opens. During operation of the filter element 5b, the raw air first passes through the filter medium 13 and subsequently into the air permeable central tube which has a rib structure at the jacket side. The thus obtained clean air is then transported from the interior of the central tube through the outlet opening in the lower terminal disk 15 to the clean air outlet 3.

Figure 3A:
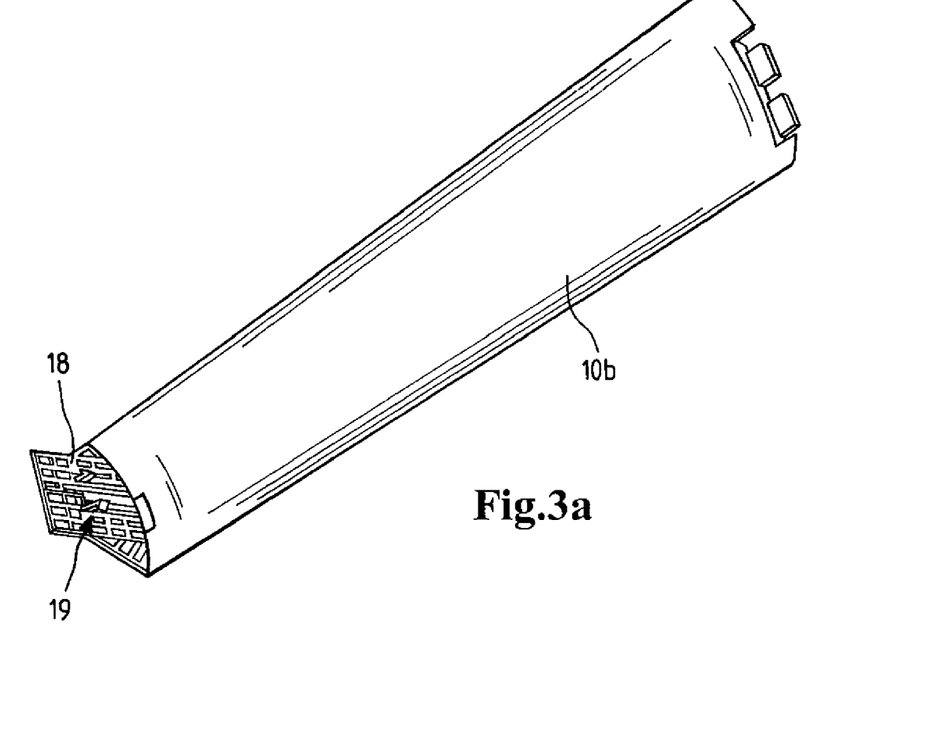
FIG. 3a the inflow protection element according to FIG. 2 in an individual illustration.

In FIG. 3a, the inflow protection element 10b of FIG. 2 is illustrated without the other elements of the filter element 5b. At one end the inflow protection element 10b has a grid 18 with locking hooks 19 of a plug connection. The grid 18 of the inflow protection element 10b or the locking hooks 19 are locked at a locking receptacle (not illustrated) that is formed at the central tube 17a and are subsequently embedded in PUR by injection molding so that the first terminal disk 14 is formed in which the inflow protection element 10b, the central tube and the filter medium are embedded. With the additional locking action a particularly safe and fixed securing action of the inflow protection element to the filter element 5b is effected.

Figure 3B:
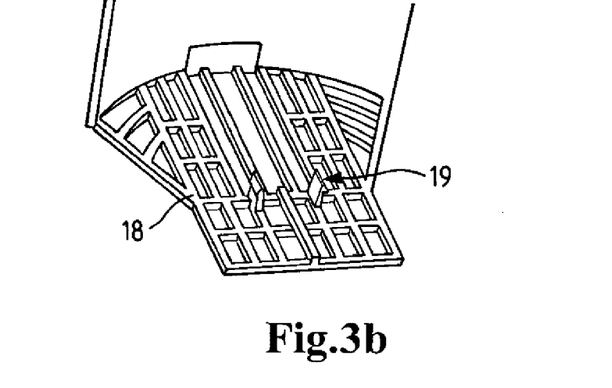
FIG. 3b a detail of the inflow protection element of FIG. 3a in a detail view.

FIG. 3b shows the grid 18 of FIG. 3a in a detail view so that the locking hooks of the plug connection 19 are visible more clearly.

Figure 4A:
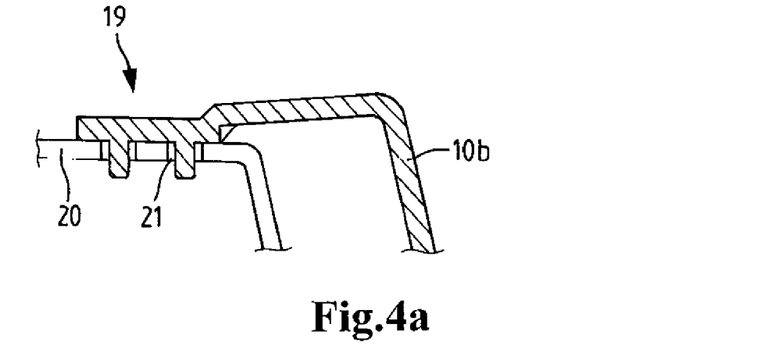
FIG. 4a a detail of a schematic cross-section of a plug connection of the filter element.

In FIG. 4a schematically a cross-section of the plug connection 19 between the upper end of the central tube 20 and the inflow protection element 10b are shown. By locking of the inflow protection element 10b on the central tube 20 a centering action can be realized that does not mandatorily fix precisely the position of the inflow protection element 10b on the central tube 20. Instead, in case of a minimal play 21, it is possible upon subsequent embedding with PUR (i.e., the embedding action) to compensate tolerances.

Figure 4B:
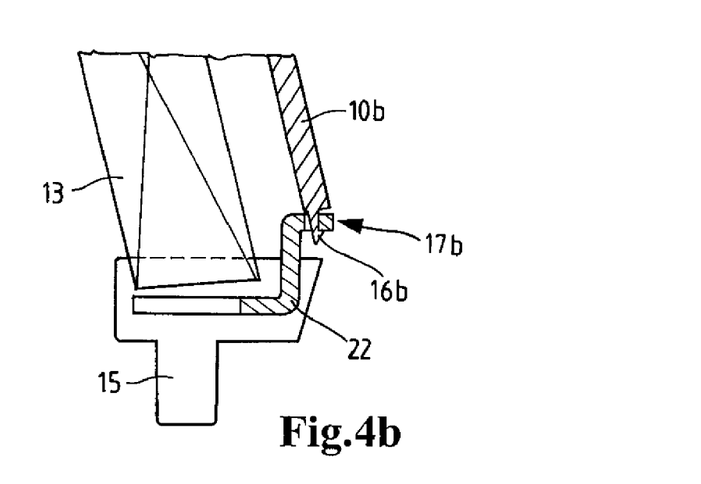
FIG. 4b a further plug connection of the filter element.

FIG. 4b shows schematically a further plug connection 17b for attachment of the inflow protection element 10b on the lower terminal disk 15 in which locking pins 16b with barbs are formed on the lower end of the inflow protection element 10b. The further plug connection 17b is characterized by a counter holder 22 that, like the filter medium 13, is embedded at one end in the further terminal disk 15. The opposite side of the counter holder 22 projects from the terminal disk 15 and has openings for receiving the locking pins 16b. As is also visible in FIG. 4b, the inflow protection element 10b is spaced from the filter medium 13 wherein the spacing is typically in the mm range.

Figure 4C:
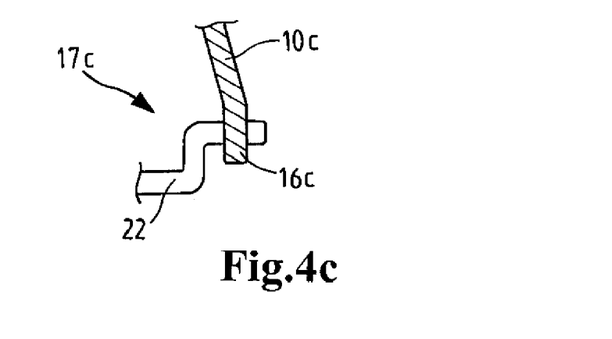
FIG. 4c a further plug connection.

In FIG. 4c, a further plug connection 17c is illustrated wherein the locking pins 16c have no barbs and are supported slideably in the counter holder 22. In this way, a tolerance compensation of the inflow protection element 10c in the longitudinal direction is achieved.

Figure 5:
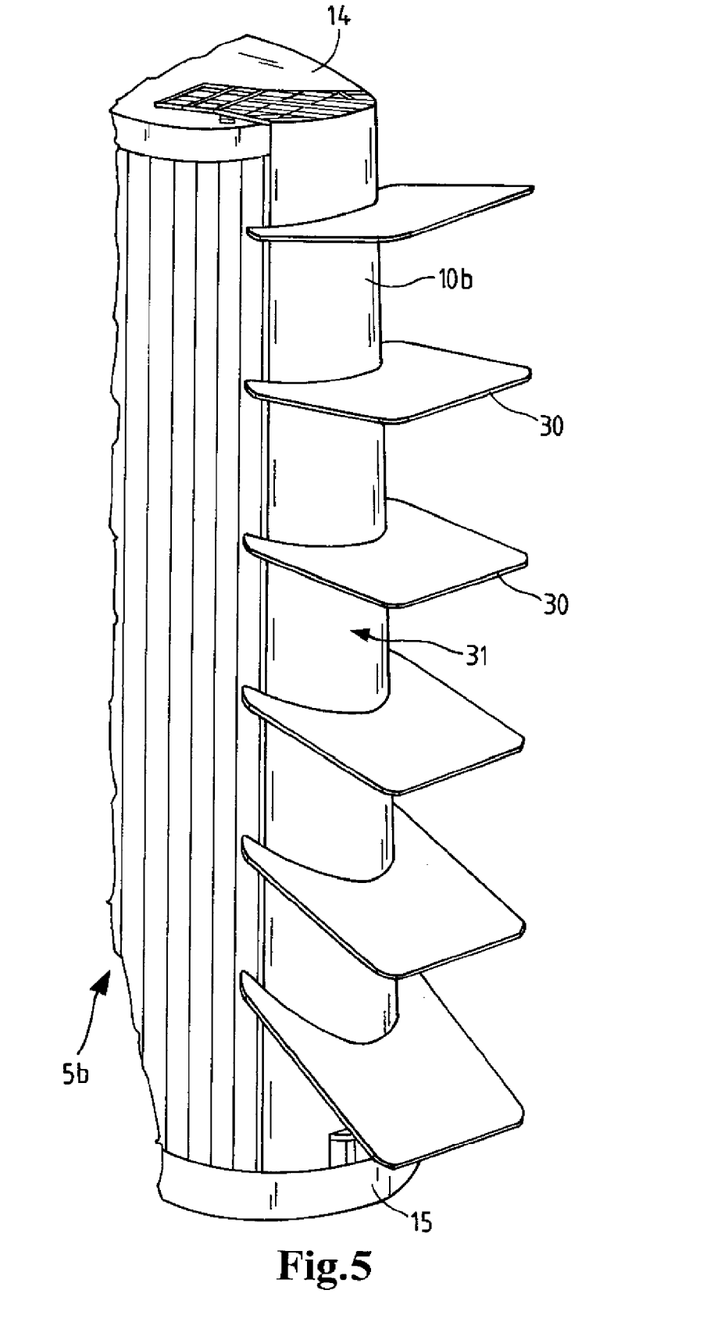
FIG. 5 the inflow protection element with guide ribs.

FIG. 5 shows an embodiment of an inflow protection element 10b with a schematically shown filter element 5b. In this embodiment, the inflow protection element 10b has on the side 31 that is facing away from the filter element one or several guide ribs 30, in particular for guiding flow in the inflow area. The guide ribs 30 are positioned in particular in planes which are substantially parallel to the terminal disks (14, 15) of the filter element (see FIG. 2) but can however be arranged, depending on the inflow condition, in the direction of the filter element 5b in a fan shape in order to enable a more uniform inflow at the filter element. The opening of the fan shape can be either facing the filter element or facing away from it.

We claim:

1. A filter element for an air inlet system, comprising:
an annular filter medium in the form of an annular bellows having an open interior and two axially opposing ends;
wherein air flow through the filter medium radially between a radial exterior face of the filter medium and a radial interior face at the open interior of the filter medium;
wherein the filter medium is operable for cleaning raw air;
an inflow protection element arranged at and overlaying a portion of the radial exterior face, and deflecting flow in an inflow area of the filter medium;
a terminal disk arranged on and covering said filter medium on a first one of said axially opposing ends of said filter medium;
wherein the first axial end of the filter medium is embedded into material of the terminal disk, securing the terminal disk onto the filter medium;
wherein the inflow protection element is directly embedded into the material of the terminal disk of the first axial end of the filter medium, such that an end part of the inflow protection element is surrounded by the material of the terminal disk;
a second terminal disk arranged on an opposing second axial end of the filter medium;
wherein the inflow protection element at an axial end proximate to the second terminal disk has at least one plug in connection element;
a counter holder having a first end secured to the second terminal disk, the counter holder having at least one complimentary plug in connection element, the complimentary plug in connection element configured to engage with the at least one plug in connection element to connect and secure the inflow protection element to the second terminal disk.

2. The filter element according to claim 1, further comprising:
an airflow permeable central tube arranged in the open interior at the radial interior face of the filter medium, the central tube supporting the filter medium at its interior face;
a first plug-in connection mounting a non-embedded second end of said inflow protection element onto said central tube;
wherein said central tube is embedded into said terminal disk.

3. The filter element according to claim 1, wherein
the at least one plug in connection element is at least one locking pin;
wherein the at least one complimentary plug in connection element of the counter holder is at least one through opening;
wherein the at least one locking pin is configured and adapted to be received into the at least one through opening to secure the inflow protection element to the second end disk.

4. The filter element according to claim 3, wherein
a portion of said inflow protection element is slideably secured into said opening of said counter holder.

5. The filter element according to claim 1, wherein
at least one of said terminal disks is formed of PUR.

6. The filter element according to claim 1, wherein
said inflow protection element in said air inflow area is air-impermeable.

7. The filter element according to claim 1, wherein
said inflow protection element extends over entire axial length of said annular filter medium to said axially opposing ends of said filter medium.

8. The filter element according to claim 1, wherein
said inflow protection element has a geometry that matches the geometry of the filter medium on which it is overlaid such that said inflow protection element is matched to a shape of said filter medium.

9. The filter element according to claim 1, wherein
said inflow protection element is spaced apart from and does not contact at least in one partial area of said radial exterior face on which said inflow protection element is overlaid.

10. The filter element according to claim 1, wherein
the at least one plug in connection element is at least one locking pin;
wherein the at least one complimentary plug in connection element of the counter holder is at least one through opening;
wherein the at least one locking pin is configured and adapted to be received into the at least one through opening to secure the inflow protection element to the second end disk;
wherein a portion of said inflow protection element is slideably secured into said opening of said counter holder;
wherein at least one of said terminal disks is formed of PUR;
wherein said inflow protection element in said air inflow area is air-impermeable;
wherein said inflow protection element extends over entire axial length of said annular filter medium to said axially opposing ends of said filter medium;
wherein said inflow protection element has a geometry that matches the geometry of the filter medium on which it is overlaid such that said inflow protection element is matched to a shape of said filter medium; and wherein said inflow protection element is spaced apart from and does not contact at least in one partial area of said radial exterior face on which said inflow protection element is overlaid.

11. The filter element according to claim 10, further comprising:
a plurality of flow guide ribs secured to a side facing away from said filter medium and extending in planes radially outwardly from said filter element.

12. An air inlet system comprising:
a filter housing including
a raw air inlet; and
a clean air outlet;
a filter element according to claim 1 arranged within said filter housing between said raw air inlet and said clean air outlet such that flow through said housing is required to flow through said filter element.

13. The air inlet system according to claim 12, wherein said inflow protection element at said first end is supported with and mounted to said filter housing.

14. The air inlet system according to claim 13, wherein said inflow protection element at least partially extends across an inflow area of the filter element within the filter housing.

15. The filter element according to claim 10, further comprising:
an airflow permeable central tube arranged in the open interior at the radial interior face of the filter medium, the central tube supporting the filter medium at its interior face;
a plug-in connection mounting a non-embedded opposing second end of said inflow protection element onto said central tube;
wherein said central tube is embedded into said terminal disk.

\* \* \* \* \*